United States Patent
Eguchi et al.

(10) Patent No.: US 9,716,267 B2
(45) Date of Patent: Jul. 25, 2017

(54) POSITIVE ELECTRODE ACTIVE MATERIAL LAYER INCLUDING FIRST POSITIVE ELECTRODE ACTIVE MATERIAL AND SECOND POSITIVE ELECTRODE ACTIVE MATERIAL, AND METHOD FOR PRODUCING POSITIVE ELECTRODE INCLUDING SAID POSITIVE ELECTRODE ACTIVE MATERIAL LAYER

(71) Applicant: KABUSHIKI KAISHA TOYOTA JIDOSHOKKI, Kariya-shi, Aichi (JP)

(72) Inventors: Tatsuya Eguchi, Kariya (JP); Takeshi Maki, Kariya (JP); Manabu Miyoshi, Kariya (JP); Yuuhi Sato, Kariya (JP); Jun Kaneda, Kariya (JP); Yusuke Yamamoto, Kariya (JP); Takahiro Sugioka, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/124,766

(22) PCT Filed: Dec. 26, 2014

(86) PCT No.: PCT/JP2014/006488
§ 371 (c)(1),
(2) Date: Sep. 9, 2016

(87) PCT Pub. No.: WO2015/136591
PCT Pub. Date: Sep. 17, 2015

(65) Prior Publication Data
US 2017/0018764 A1    Jan. 19, 2017

(30) Foreign Application Priority Data
Mar. 10, 2014    (JP) ................ 2014-046163

(51) Int. Cl.
| | | |
|---|---|---|
| *H01M 4/36* | (2006.01) | |
| *H01M 4/62* | (2006.01) | |
| *H01M 4/505* | (2010.01) | |
| *H01M 4/58* | (2010.01) | |
| *H01M 10/0525* | (2010.01) | |
| *H01M 4/525* | (2010.01) | |
| *H01M 4/13* | (2010.01) | |
| *H01M 4/139* | (2010.01) | |
| *H01M 4/04* | (2006.01) | |
| *H01M 10/052* | (2010.01) | |
| *H01M 4/02* | (2006.01) | |

(52) U.S. Cl.
CPC ......... *H01M 4/364* (2013.01); *H01M 4/0404* (2013.01); *H01M 4/13* (2013.01); *H01M 4/139* (2013.01); *H01M 4/366* (2013.01); *H01M 4/505* (2013.01); *H01M 4/525* (2013.01); *H01M 4/5825* (2013.01); *H01M 4/625* (2013.01); *H01M 10/0525* (2013.01); *H01M 4/0433* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | |
|---|---|---|
| 2011/0223482 A1 | 9/2011 | Fujii et al. |
| 2012/0156560 A1 | 6/2012 | Hong et al. |
| 2012/0231341 A1 | 9/2012 | Kim et al. |
| 2013/0084492 A1 | 4/2013 | Yanagita et al. |
| 2016/0149205 A1* | 5/2016 | Theivanayagam ... H01M 4/661 427/58 |

FOREIGN PATENT DOCUMENTS

| | | |
|---|---|---|
| JP | 2004-047180 A | 2/2004 |
| JP | 2007-317534 A | 12/2007 |
| JP | 2007-317538 A | 12/2007 |
| JP | 2008-034218 A | 2/2008 |
| JP | 2011-159388 A | 8/2011 |
| JP | 2011-228293 A | 11/2011 |
| JP | 2012-190786 A | 10/2012 |
| JP | 2013-077421 A | 4/2013 |
| JP | 2013-178935 A | 9/2013 |

* cited by examiner

*Primary Examiner* — Patrick Ryan
*Assistant Examiner* — Christopher Domone
(74) *Attorney, Agent, or Firm* — Sughrue Mion, PLLC

(57) ABSTRACT

A parameter for producing a positive electrode having excellent safety, and a positive electrode active material layer satisfying the parameter. The positive electrode active material layer includes a first positive electrode active material, a second positive electrode active material having a lower charge/discharge potential than the first positive electrode active material, and an additive. When the first positive electrode active material tap density is defined as $dt_1$, the second positive electrode active material tap density is defined as $dt_2$, a true density of the additive is defined as $d_3$, a mass percentage of the first positive electrode active material is defined as $Wt_1$, a mass percentage of the second positive electrode active material is defined as $Wt_2$, a mass percentage of the additive is defined as $Wt_3$, and a porosity of the positive electrode active material layer is defined as p, the positive electrode active material layer satisfies $(1-p) \times (Wt_1/dt_1)/((Wt_1/dt_1)+(Wt_2/dt_2)+(Wt_3/d_3)) < 0.38$.

3 Claims, No Drawings

US 9,716,267 B2

POSITIVE ELECTRODE ACTIVE MATERIAL LAYER INCLUDING FIRST POSITIVE ELECTRODE ACTIVE MATERIAL AND SECOND POSITIVE ELECTRODE ACTIVE MATERIAL, AND METHOD FOR PRODUCING POSITIVE ELECTRODE INCLUDING SAID POSITIVE ELECTRODE ACTIVE MATERIAL LAYER

CROSS REFERENCE TO RELATED APPLICATIONS

This application is a National Stage of International Application No. PCT/JP2014/006488 filed Dec. 26, 2014, claiming priority based on Japanese Patent Application No. 2014-046163 filed Mar. 10, 2014, the contents of all of which are incorporated herein by reference in their entirety.

TECHNICAL FIELD

The present invention relates to a positive electrode active material layer including a first positive electrode active material and a second positive electrode active material, and a method for producing a positive electrode including the positive electrode active material layer.

BACKGROUND ART

Various materials are known to be used as positive electrode active materials of secondary batteries, and further a secondary battery in which a plurality of materials are used as positive electrode active materials is also known.

For example, Patent Literature 1 and 2 each specifically discloses a lithium ion secondary battery in which $LiNi_{1/3}CO_{1/3}Mn_{1/3}O_2$ and $LiFePO_4$ are used as positive electrode active materials. Patent Literature 3 specifically discloses a lithium ion secondary battery in which $LiNi_{0.8}CO_{0.1}Mn_{0.1}O_2$ and $LiV_{2/3}PO_4$ are used as positive electrode active materials.

These literature states that $LiNi_{1/3}Co_{1/3}Mn_{1/3}O_2$ or $LiNi_{0.8}Co_{0.1}Mn_{0.1}O_2$ is a positive electrode active material having a high capacity, and $LiFePO_4$ or $LiV_{2/3}PO_4$ is a positive electrode active material having excellent safety. In these literature, in producing a specific lithium ion secondary battery, blending ratios of the two types of the positive electrode active materials are defined on a mass basis.

Here, a battery having a higher blending ratio of $LiFePO_4$ or $LiV_{2/3}PO_4$, which has excellent safety, is considered to have higher safety.

CITATION LIST

Patent Literature

Patent Literature 1: JP2011228293 (A)
Patent Literature 2: JP2013178935 (A)
Patent Literature 3: JP201377421 (A)

SUMMARY OF INVENTION

Technical Problem

Different materials have different densities (true densities), which is technical common knowledge. Therefore, even when the same mass of two types of materials is weighed, the volumes of both materials are naturally different from each other. In addition, a person skilled in the art knows, as an empirical rule, that even the same type of material has different densities (tap densities) when actually handled as powder, due to a difference in producing method, lot, or mean particle diameter, etc. The same applies to active materials.

Here, the case of selecting $LiNi_{5/10}Co_{2/10}Mn_{3/10}O_2$ and $LiFePO_4$ as two types of active materials and producing a positive electrode active material layer including these active materials in the same mass, is assumed. The true density of $LiNi_{5/10}Co_{2/10}Mn_{3/10}O_2$ is 4.8 g/cm³, the true density of $LiFePO_4$ is 3.6 g/cm³, and the ratio of the true densities is 4.8/3.6=1.33. When the tap densities of $LiNi_{5/10}CO_{2/10}Mn_{3/10}O_2$ and $LiFePO_4$ are equal to the true densities thereof, the volume ratio of the active materials in the positive electrode active material layer including these active materials in the same mass is roughly about 1.33:1. However, an example of the tap density of $LiNi_{5/10}Co_{2/10}Mn_{3/10}O_2$ is 2.2 g/cm³, and an example of the tap density of $LiFePO_4$ is 0.8 g/cm³. In this case, the ratio of the tap densities is 2.2/0.8=2.75. As a result, the volume ratio of the active materials in the positive electrode active material layer including these active materials in the same mass is actually 2.75:1. As described above, a tap density greatly varies due to a difference in producing method, lot, or mean particle diameter, etc. That is, even when the blending masses of the two types of active materials in the positive electrode active material layer are equal to each other, the actual volume of each active material in the positive electrode active material layer is significantly different due to a difference in producing method, lot, or mean particle diameter, etc. of each selected active material.

The present inventors have considered that evaluating how much of a positive electrode active material layer the volume of a material that practically serves a role of discharging of a positive electrode actually occupies is a key for examining safety when short circuiting of a secondary battery occurs.

However, as disclosed in the above Patent Literature, the blending ratios of the two types of positive electrode active materials are normally defined on the basis of only mass, and the volumes of the active materials have not been considered.

The present invention has been made in view of the above-described situation, and an objective of the present invention is to propose a new parameter for producing a positive electrode active material layer and a positive electrode having excellent safety and to provide a positive electrode active material layer that satisfies the parameter and a method for producing a positive electrode including the positive electrode active material layer.

Solution to Problem

The present inventors have examined factors related to safety for a positive electrode active material layer including a first positive electrode active material and a second positive electrode active material. Then, as a result of many experiments, the present inventors have indicated, as factors for a positive electrode active material layer exhibiting excellent safety, the tap densities of the positive electrode active materials, the blending amounts of the positive electrode active materials, the actual volume of each positive electrode active material calculated from the tap density and the blending amount, the porosity of the positive electrode active material layer, and a positive electrode active material layer occupancy ratio of the first positive electrode active material calculated from these values, and have found that the positive electrode active material layer occupancy ratio of the first positive electrode active material and the safety of a battery have a certain relationship.

Specifically, a positive electrode active material layer of the present invention is:

a positive electrode active material layer including a first positive electrode active material, a second positive electrode active material having a lower charge/discharge potential than the first positive electrode active material, and an additive, wherein when a tap density of the first positive electrode active material is defined as $dt_1$, a tap density of the second positive electrode active material is defined as $dt_2$, a true density of the additive is defined as $d_3$, a mass percentage of the first positive electrode active material in the positive electrode active material layer is defined as $Wt_1$, a mass percentage of the second positive electrode active material in the positive electrode active material layer is defined as $Wt_2$, a mass percentage of the additive in the positive electrode active material layer is defined as $Wt_3$, and a porosity of the positive electrode active material layer is defined as p, the positive electrode active material layer satisfies $(1-p)\times(Wt_1/dt_1)/((Wt_1/dt_1)+(Wt_2/dt_2)+(Wt_3/d_3))<0.38$.

In addition, a method for producing a positive electrode of the present invention, including the positive electrode active material layer of the present invention includes:

a) a step of mixing a first positive electrode active material, a second positive electrode active material having a lower charge/discharge potential than the first positive electrode active material, an additive, and a solvent to produce a dispersion liquid;

b) a step of applying the dispersion liquid to a current collector and removing the solvent contained in the dispersion liquid, to form a positive electrode active material layer;

c) a step of inputting a compression thickness into a compression device or inputting a compression pressure to the positive electrode active material layer, into the compression device, such that p satisfies $(1-p)\times(Wt_1/dt_1)/((Wt_1/dt_1)+(Wt_2/dt_2)+(Wt_3/d_3))<0.38$, when a tap density of the first positive electrode active material is defined as $dt_1$, a tap density of the second positive electrode active material is defined as $dt_2$, a true density of the additive is defined as $d_3$, a mass percentage of the first positive electrode active material in the positive electrode active material layer is defined as $Wt_1$, a mass percentage of the second positive electrode active material in the positive electrode active material layer is defined as $Wt_2$, a mass percentage of the additive in the positive electrode active material layer is defined as $Wt_3$, and a porosity of the positive electrode active material layer after the following step d) is defined as p; and d) a step of compressing the positive electrode active material layer obtained in the step b), by the compression device.

Advantageous Effects of Invention

A lithium ion secondary battery including the positive electrode active material layer of the present invention is able to suppress an increase in the surface temperatures of a positive electrode and a negative electrode to a certain degree even when short circuiting of the positive electrode and the negative electrode occurs.

DESCRIPTION OF EMBODIMENTS

The following describes a best mode for carrying out the present invention. Unless mentioned otherwise in particular, a numerical value range of "x to y" described in the present specification includes, in a range thereof, a lower limit "x" and an upper limit "y". A numerical value range can be formed by arbitrarily combining such upper limit values, lower limit values, and numerical values described in Examples. In addition, numerical values arbitrarily selected within the numerical value range can be used as upper limit and lower limit numerical values.

The positive electrode active material layer of the present invention is:

a positive electrode active material layer including a first positive electrode active material, a second positive electrode active material having a lower charge/discharge potential than the first positive electrode active material, and an additive, wherein when a tap density of the first positive electrode active material is defined as $dt_1$, a tap density of the second positive electrode active material is defined as $dt_2$, and a true density of the additive is defined as $d_3$, a mass percentage of the first positive electrode active material in the positive electrode active material layer is defined as $Wt_1$, a mass percentage of the second positive electrode active material in the positive electrode active material layer is defined as $Wt_2$, and a mass percentage of the additive in the positive electrode active material layer is defined as $Wt_3$, and a porosity of the positive electrode active material layer is defined as p, $$(1-p)\times(Wt_1/dt_1)/((Wt_1/dt_1)+(Wt_2/dt_2)+(Wt_3/d_3))<0.38$$

(hereinafter, sometimes referred to as "parameter of the present invention") is satisfied.

The first positive electrode active material is a material that functions as a positive electrode active material of a lithium ion secondary battery.

As the first positive electrode active material, a material known in the art to function as a positive electrode active material of a lithium ion secondary battery may be used. Specifically, from a standpoint of high capacity, the first positive electrode active material is preferably a compound (hereinafter, sometimes referred to as "NCM") having a layered rock salt structure and represented by a general formula: $Li_aNi_bCo_cMn_dD_eO_f$ ($0.2 \leq a \leq 1.7$, $b+c+d+e=1$, $0 \leq e < 1$, D is at least one element selected from Li, Fe, Cr, Cu, Zn, Ca, Mg, Zr, S, Si, Na, K, and Al, $1.7 \leq f \leq 2.1$).

In the general formula: $Li_aNi_bCo_cMn_dD_eO_f$ ($0.2 \leq a \leq 1.7$, $b+c+d+e=1$, $0 \leq e < 1$, D is at least one element selected from Li, Fe, Cr, Cu, Zn, Ca, Mg, Zr, S, Si, Na, K, and Al, $1.7 \leq f \leq 2.1$), the values of b, c, and d are not particularly limited as long as the values satisfy the above condition, but b, c, and d preferably satisfy $0<b<1$, $0<c<1$, and $0<d<1$, and at least either one of b, c, and d is preferably in the range of $0<b<80/100$, $0<c<70/100$, or $10/100<d<1$, more preferably in the range of $10/100<b<68/100$, $12/100<c<60/100$, or $20/100<d<68/100$, further preferably in the range of $25/100<b<60/100$, $15/100<c<50/100$, or $25/100<d<60/100$, particularly preferably in the range of $\frac{1}{3} \leq b \leq 150/100$, $20/100 \leq c \leq \frac{1}{3}$, or $30/100 \leq d \leq \frac{1}{3}$, and most preferably $b=\frac{1}{3}$, $c=\frac{1}{3}$, or $d=\frac{1}{3}$, or $b=50/100$, $c=20/100$, or $d=30/100$.

Preferably, a is in the range of $0.5 \leq a \leq 1.5$, more preferably in the range of $0.7 \leq a \leq 1.3$, further preferably in the range of $0.9 \leq a \leq 1.2$, and particularly preferably in the range of $1 \leq a \leq 1.1$.

Regarding e and f, the values thereof may be any values as long as the values are in the ranges specified for the general formula, and an example thereof is $e=0$ and $f=2$.

The shape of the first positive electrode active material is not particularly limited, but the mean particle diameter thereof is preferably not larger than 100 μm, and further preferably not smaller than 0.1 μm and not larger than 50 μm. If the mean particle diameter is less than 0.1 μm, a problem, such as adhesion to a current collector being easily impaired when an electrode is produced, may arise. If the mean particle diameter exceeds 100 μm, a problem, such as influencing the size of an electrode or damaging a separator included in a secondary battery, may arise. The mean particle diameter in the present specification refers to a value of D50 measured by a general laser diffraction type particle size distribution measuring device.

The second positive electrode active material is a material that is able to function as a positive electrode active material of a lithium ion secondary battery and has a lower charge/discharge potential than the first positive electrode active material.

Specific examples of the second positive electrode active material, for example, in the case where the first positive electrode active material is the NCM include materials represented by a general formula: $LiM_hPO_4$ (M is at least one element selected from Mn, Fe, Co, Ni, Cu, Mg, Zn, V, Ca, Sr, Ba, Ti, Al, Si, B, Te, and Mo 0<h<2). In a lithium ion secondary battery including the positive electrode active material layer of the present invention, since the charge/discharge potential of the second positive electrode active material is lower than the charge/discharge potential of the first positive electrode active material, the first positive electrode active material practically serves a role of charging and discharging of a positive electrode. If the second positive electrode active material is present in the positive electrode active material layer of the lithium ion secondary battery, even when short circuiting of the positive electrode and a negative electrode of the battery occurs, heat generation of the battery is suppressed to a certain degree.

Further specific examples of the second positive electrode active material include $LiFePO_4$, $LiMnPO_4$, $LiVPO_4$, $LiNiPO_4$, $LiCoPO_4$, $LiTePO_4$, $LiV_{2/3}PO_4$, $LiFe_{2/3}PO_4$, and $LiMn_{7/8}Fe_{1/8}PO_4$. As the second positive electrode active material, $LiFePO_4$ is particularly preferable. The reason is as follows. $LiFePO_4$ exhibits a relatively flat discharging curve during discharging. Therefore, even if short circuiting of the positive electrode and the negative electrode of the lithium ion secondary battery occurs to cause rapid discharging, a rapid potential difference associated with the discharging does not occur at a part at which $LiFePO_4$ is present. Thus, it is hard to induce transfer of charge from another part within the electrode, so that occurrence of an overcurrent is suppressed. As a result, heat generation of the secondary battery is suitably suppressed.

The shape of the second positive electrode active material is not particularly limited, but the mean particle diameter thereof is preferably not larger than 100 μm, and more preferably not smaller than 0.01 μm and not larger than 10 μm. As the second positive electrode active material, a material of which the surface is coated with carbon is preferably used. In addition, the mean particle diameter of the second positive electrode active material is preferably smaller than the mean particle diameter of the first positive electrode active material.

The blending amounts of the first positive electrode active material and the second positive electrode active material in the positive electrode active material layer may be values that satisfy the parameter of the present invention. If the blending mass ratio of the first positive electrode active material and the second positive electrode active material in the positive electrode active material layer of the present invention is to be mentioned, the blending mass ratio is preferably in the range of 95:5 to 50:50, more preferably in the range of 85:15 to 55:45, further preferably in the range of 75:25 to 60:40, and particularly preferably in the range of 72:28 to 65:35. In addition, if the total blending amount of the first positive electrode active material and the second positive electrode active material in the positive electrode active material layer of the present invention is to be mentioned, the total blending amount is preferably in the range of 50 to 99 mass %, more preferably in the range of 60 to 98 mass %, and particularly preferably in the range of 70 to 97 mass %.

Examples of the additive include a conductive additive, a binding agent, and a dispersant.

The conductive additive is added for enhancing the conductivity of an electrode. Thus, the conductive additive is preferably added optionally when the conductivity of an electrode is insufficient, and does not have to be added when the conductivity of an electrode is sufficiently superior. The conductive additive may be a chemically inert fine electron conductor, and examples of the conductive additive include carbonaceous fine particles such as carbonblack, graphite, acetyleneblack, Ketchenblack (Registered Trademark), vapor grown carbon fiber (VGCF), and various metallic particles. One of these conductive additives or a combination of two or more of these conductive additives may be added to the positive electrode active material layer.

The shape of the conductive additive is not particularly limited, but the mean particle diameter thereof is preferably smaller in terms of a role thereof. The mean particle diameter of the conductive additive is preferably not larger than 10 μm and further preferably in the range of 0.01 to 1 μm.

The blending amount of the conductive additive may be any value as long as the value satisfies the parameter of the present invention. If the blending amount of the conductive additive in the positive electrode active material layer of the present invention is to be mentioned, the blending amount of the conductive additive is preferably in the range of 0.5 to 10 mass %, more preferably in the range of 1 to 7 mass %, and particularly preferably in the range of 2 to 5 mass %.

The binding agent serves a role of fastening the positive electrode active material and the conductive additive to the surface of a current collector. Examples of the binding agent include fluorine-containing resins such as polyvinylidene fluoride, polytetrafluoroethylene, and fluororubbers, thermoplastic resins such as polypropylene and polyethylene, imide based resins such as polyimide and polyamide-imide, and alkoxysilyl group-containing resins. In addition, a polymer having a hydrophilic group may be used as the binding agent. Examples of the hydrophilic group of the polymer having the hydrophilic group include carboxyl group, sulfo group, silanol group, amino group, hydroxyl group, and phosphoric acid group. Specific examples of the polymer having the hydrophilic group include polyacrylic acid, carboxymethyl cellulose, polymethacrylic acid, and poly(p-styrenesulfonic acid).

The blending amount of the binding agent may be any value as long as the value satisfies the parameter of the present invention. If the blending amount of the binding agent in the positive electrode active material layer of the present invention is to be mentioned, the blending amount of the binding agent is preferably in the range of 0.5 to 10 mass %, more preferably in the range of 1 to 7 mass %, and particularly preferably in the range of 2 to 5 mass %. If the blending amount of the binding agent is excessively small, when a composition is used for the positive electrode active material layer, the moldability of this layer may decrease. In addition, if the blending amount of the binding agent is excessively large, the amount of the positive electrode active material in the positive electrode active material layer decreases, and thus the excessively large amount of the binding agent is not preferable.

As additives such as a dispersant other than the conductive additive and the binding agent, additives known in the art may be used. These additives may be blended in the positive electrode active material layer so as to satisfy the parameter of the present invention.

The parameter of the present invention is now described. The parameter of the present invention is $(1-p) \times (Wt_1/dt_1) / ((Wt_1/dt_1) + (Wt_2/dt_2) + (Wt_3/d_3)) < 0.38$.

Here, since p refers to the porosity of the positive electrode active material layer, (1−P) refers to the ratio of solid matters in the positive electrode active material layer. The porosity p is a value obtained by: subtracting, from the actual volume (Vr) of a produced positive electrode active material layer, the sum (Vt) of theoretical volumes of the respective components included in the positive electrode active material layer, the theoretical volumes being calculated from the blending amounts and the true densities of the respective components; and dividing the resultant value by the actual volume (Vr) of the produced positive electrode active material layer. When the porosity p is represented by a mathematical expression, the mathematical expression is $p=(Vr-Vt)/Vr$. The range of p is not particularly limited. However, if a preferable range of p is to be mentioned, p is preferably in the range of $0.10<p<0.50$, more preferably in the range of $0.20<p<0.40$, and particularly preferably in the range of $0.25<p<0.30$.

Since $dt_1$ refers to the tap density of the first positive electrode active material and $Wt_1$ refers to the mass percentage of the first positive electrode active material in the positive electrode active material layer, $(Wt_1/dt_1)$ refers to the actual volume percentage of the first positive electrode active material in the positive electrode active material layer. Similarly, $(Wt_2/dt_2)$ refers to the actual volume percentage of the second positive electrode active material in the positive electrode active material layer. The tap density in the present specification refers to the "tap bulk density" defined in JIS R 1628 Test methods for bulk density of fine ceramic powder, and the constant-mass measuring method is used as a method for measuring the tap density.

Since $d_3$ refers to the true density of the additive and $Wt_3$ refers to the mass percentage of the additive, $(Wt_3/d_3)$ refers to the volume percentage of the additive in the positive electrode active material layer. Here, the reason for using the true density, not the tap density, for the additive is as follows. First, the binding agent, which is used widely as an additive, is dissolved in a solvent in a dispersion liquid for producing the positive electrode active material layer, and is not in a solid state. The state of the binding agent in the positive electrode active material layer produced through removal of the solvent from the dispersion liquid is not considered as being the same as the state of the binding agent that has not been dissolved in the solvent. Thus, using the tap density of the binding agent that has not been dissolved in the solvent, for the parameter of the present invention, is not meaningful. In addition, the conductive additive, which is used widely as an additive, normally has a significantly small mean particle diameter as compared to the first positive electrode active material or the second positive electrode active material, so that no significant difference is inferred to occur between the tap density and the true density of the conductive additive. Furthermore, normally, the additive is a minor component in the positive electrode active material layer. Thus, even if a significant difference occurs between the tap density and the true density of the conductive additive or even if a significant difference occurs between tap densities of the same conductive additive, no particular problem is assumed in the actual production site, and also the significant difference is inferred to have no particular effect on battery safety that is to be represented by the parameter of the present invention.

In the positive electrode active material layer in which a plurality of additives are used, $(Wt_3/d_3)$ is divided into sections of which the number is equal to the number of the additives. For example, in the positive electrode active material layer in which two types of additives that are a first additive and a second additive are used, the mass percentage and the true density of the first additive may be defined as $Wt_{3-1}$ and $d_{3-1}$, respectively, the mass percentage and the true density of the second additive may be defined as $Wt_{3-2}$ and $d_{3-2}$, respectively, and $(Wt_3/d_3)$ in the parameter of the present invention may be replaced with $((Wt_{3-1}/d_{3-1})+(Wt_{3-2}/d_{3-2}))$. When no additive is used, $(Wt_3/d_3)$ only needs to be removed from the parameter of the present invention.

From the above-described matters, $(1-p) \times (Wt_1/dt_1) / ((Wt_1/dt_1) + (Wt_2/dt_2) + (Wt_3/d_3))$ represents an occupancy ratio or approximate occupancy ratio of the first positive electrode active material among the solid matters in the positive electrode active material layer (hereinafter, the "occupancy ratio or approximate occupancy ratio of the first positive electrode active material among the solid matters in the positive electrode active material layer" is sometimes referred to merely as "occupancy ratio"). The occupancy ratio is less than 0.38, preferably less than 0.37, and more preferably 0.36. The lower limit of the occupancy ratio may be a value exceeding 0. However, when the performance of a battery is taken into consideration, the occupancy ratio is preferably not lower than 0.10, more preferably not lower than 0.20, further preferably not lower than 0.30, and particularly preferably not lower than 0.32, since the battery has a higher capacity if the occupancy ratio is higher.

In the above, regarding $(1-p) \times (Wt_1/dt_1) / ((Wt_1/dt_1) + (Wt_2/dt_2) + (Wt_3/d_3))$, for example, $Wt_1$ is defined as the mass percentage of the first positive electrode active material in the positive electrode active material layer. However, since the parameter of the present invention represents the occupancy ratio, for example, values of blending masses of respective components used in a step a) in a later-described method for producing the positive electrode of the present invention may be directly substituted as $Wt_1$, $Wt_2$, and $Wt_3$, respectively, into the parameter of the present invention.

The method for producing the positive electrode of the present invention, including the positive electrode active material layer of the present invention, is now described.

The method for producing the positive electrode of the present invention includes:

a) a step (hereinafter, sometimes referred to as "step a)") of mixing a first positive electrode active material, a second positive electrode active material having a lower charge/discharge potential than the first positive electrode active material, an additive, and a solvent to produce a dispersion liquid;

b) a step (hereinafter, sometimes referred to as "step b)") of applying the dispersion liquid to a current collector and removing the solvent contained in the dispersion liquid, to form a positive electrode active material layer;

c) a step (hereinafter, sometimes referred to as "step c)") inputting a compression thickness into a compression device or inputting a compression pressure to the positive electrode active material layer, into the compression device, such that p satisfies $(1-p)\times(Wt_1/dt_1)/((Wt_1/dt_1)+(Wt_2/dt_2)+(Wt_3/d_3))<0.38$, when a tap density of the first positive electrode active material is defined as $dt_1$, a tap density of the second positive electrode active material is defined as $dt_2$, a true density of the additive is defined as $d_3$, a mass percentage of the first positive electrode active material in the positive electrode active material layer is defined as $Wt_1$, a mass percentage of the second positive electrode active material in the positive electrode active material layer is defined as $Wt_2$, a mass percentage of the additive in the positive electrode active material layer is defined as $Wt_3$, and a porosity of the positive electrode active material layer after the following step d) is defined as p; and d) a step (hereinafter, sometimes referred to as "step d)") of compressing the positive electrode active material layer obtained in the step b), by the compression device.

The step a) is a step of mixing a first positive electrode active material, a second positive electrode active material having a lower charge/discharge potential than the first positive electrode active material, an additive, and a solvent to produce a dispersion liquid.

Specific examples of the solvent include N-methyl-2-pyrrolidone (hereinafter, sometimes abbreviated as "NMP"), dimethylformamide, dimethylacetamide, methanol, acetone, methyl ethyl ketone, methyl isobutyl ketone, cyclohexanone, methyl acetate, ethyl acetate, and tetrahydrofuran. One of these solvents may be used singly, or a combination of two or more of these solvents may be used. The dispersion liquid in the step a) includes the solvent and solid matters other than the solvent. The solid matters other than the solvent refer to the first positive electrode active material, the second positive electrode active material, and the additive such as a binding agent, a conductive additive, and a dispersant used if necessary. In the dispersion liquid in the step a), the blending amount of the solid matters other than the solvent is preferably in the range of 30 to 90 mass %, more preferably in the range of 50 to 80 mass %, and particularly preferably in the range of 60 to 70 mass %.

In the step a), the respective components may be added simultaneously or sequentially and mixed by a mixing device.

Examples of the mixing device include a mixing and agitating machine, a ball mill, a sand mill, a bead mill, a dispersing machine, an ultrasonic dispersing machine, a homogenizer, a homomixer, a planetary mixer, and a defoaming planetary mixer. Specific examples of the mixing device include trade name Disper mixer (PRIMIX Corporation), trade name CLEARMIX (M Technique Co., Ltd.), trade name FILMIX (PRIMIX Corporation), trade name Paint Conditioner (Red Devil Equipment Co.), trade name DYNO-MILL (Shinmaru Enterprises Corporation), trade name Eirich Intensive Mixer (Nippon Eirich Co., Ltd.), trade name defoaming/deaeration machine DP-200 (M Technique Co., Ltd.), and trade name AWATORI RENTARO (Thinky Corporation). The mixing speed of the mixing device may be appropriately set to a speed at which the respective components of the composition are allowed to be dispersed or dissolved suitably.

The step b) is a step of applying the dispersion liquid produced in the step a) to a current collector and removing the solvent contained in the dispersion liquid, to form a positive electrode active material layer.

The current collector refers to a fine electron conductor that is chemically inert for continuously sending a flow of current to an electrode during discharge or charging of a lithium ion secondary battery. Examples of the current collector include at least one selected from silver, copper, gold, aluminum, magnesium, tungsten, cobalt, zinc, nickel, iron, platinum, tin, indium, titanium, ruthenium, tantalum, chromium, and molybdenum, and metal materials such as stainless steel. The current collector may be coated with a protective layer known in the art.

The current collector takes forms such as a foil, a sheet, a film, a line shape, and a bar shape. Thus, as the current collector, for example, metal foils such as copper foil, nickel foil, aluminum foil, and stainless steel foil may be suitably used. When the current collector is in the form of a foil, a sheet, or a film, the thickness of the current collector is preferably in the range of 10 μm to 100 μm.

Examples of a specific method for applying the dispersion liquid to the current collector include conventional methods known in the art such as roll coating method, dip coating method, doctor blade method, spray coating method, and curtain coating method.

Examples of a specific method for removing the solvent contained in the dispersion liquid include a method in which the dispersion liquid is dried under a heating condition and/or a reduced pressure condition to remove, as gas, the solvent contained in the dispersion liquid.

The step c) is a step of inputting a compression thickness into a compression device or inputting a compression pressure to the positive electrode active material layer, into the compression device, such that p satisfies $(1-p)\times(Wt_1/dt_1)/((Wt_1/dt_1)+(Wt_2/dt_2)+(Wt_3/d_3))<0.38$, when a tap density of the first positive electrode active material is defined as $dt_1$, a tap density of the second positive electrode active material is defined as $dt_2$, a true density of the additive is defined as $d_3$, a mass percentage of the first positive electrode active material in the positive electrode active material layer is defined as $Wt_1$, a mass percentage of the second positive electrode active material in the positive electrode active material layer is defined as $Wt_2$, a mass percentage of the additive in the positive electrode active material layer is defined as $Wt_3$, and a porosity of the positive electrode active material layer after the following step d) is defined as p.

The "compression thickness" refers to a thickness dimension during compression when a compression pressure is applied by the compression device.

As the compression device, a conventional device known in the art may be used. Specific examples of the compression device include a roll press machine, a vacuum press machine, a hydraulic press machine, and an oil hydraulic press machine.

The porosity p is a value obtained by: subtracting, from the actual volume (Vr) of the produced positive electrode active material layer, the sum (Vt) of theoretical volumes of the respective components included in the positive electrode active material layer, the theoretical volumes being calculated from the blending amounts and the true densities of the respective components; and dividing the resultant value by the actual volume (Vr) of the produced positive electrode active material layer. Thus, by controlling a height (thickness) of a positive electrode active material layer to be produced, a positive electrode active material layer having desired p is obtained. In this case, a calculation step of calculating a height (thickness) of a positive electrode active material layer to be produced, such that p satisfies $(1-p)\times(Wt_1/dt_1)/((Wt_1/dt_1)+(Wt_2/dt_2)+(Wt_3/d_3))<0.38$, is preferably used in the step c). Specifically, Vt is calculated from a true density $d_1$ of the first positive electrode active material, a true density $d_2$ of the second positive electrode active material, and a true density $d_3$ of the additive, contained in the dispersion liquid used in the step b), $Wt_1$, $Wt_2$, $Wt_3$, and the mass of the positive electrode active material layer obtained in the step b); and the volume of the positive electrode active material layer to be produced in the step d) is calculated such that desired p is obtained. From the volume calculated thus, the height (thickness) of the positive electrode active material layer to be produced is calculated.

Then, on the basis of the calculated height of the positive electrode active material layer, an appropriate compression thickness that takes a restoring force or the thickness of the current collector into consideration may be inputted into the compression device as appropriate.

Alternatively, a positive electrode active material layer having desired p is obtained by calculating p' of a positive electrode active material layer produced with a certain compression pressure or a certain thickness, appropriately increasing/decreasing a compression pressure or a thickness on the basis of the compression pressure or the thickness and p', and inputting the compression pressure or the thickness into the compression device. Controlling the compression pressure is substantially synonymous with controlling the height (thickness) of the positive electrode active material layer to be produced.

Examples of the compression pressure at the compression device include the range of 1 to 5000 kN.

The step d) is a step of compressing the positive electrode active material layer obtained in the step b), by the compression device. The step d) may be performed under a heating condition. In addition, after the step d), a drying step of drying the positive electrode may be performed. After the step d), a confirmation step of confirming whether the produced positive electrode active material layer satisfies $(1-p) \times (Wt_1/dt_1)/((Wt_1/dt_1)+(Wt_2/dt_2)+(Wt_3/d_3)) < 0.38$ is preferably performed.

The producing method of the present invention is preferably performed under an inert gas atmosphere.

A lithium ion secondary battery is allowed to be produced by using the positive electrode of the present invention. The lithium ion secondary battery includes the positive electrode, a negative electrode, a separator, and an electrolytic solution as battery components.

The negative electrode includes a current collector and a negative electrode active material layer bound to the surface of the current collector. The negative electrode active material layer includes a negative electrode active material, and a binding agent and/or a conductive additive if necessary. As the current collector, the binding agent, and the conductive additive, those described in relation to the positive electrode may be used. In addition, styrene-butadiene rubber may be used as the binding agent for the negative electrode active material layer.

Examples of the negative electrode active material include a carbon based material capable of occluding and releasing lithium, an element capable of forming an alloy with lithium, a compound including an element capable of forming an alloy with lithium, and a polymer material.

Examples of the carbon based material include hardly graphitizable carbon, natural graphite, artificial graphite, cokes, graphites, glassy carbons, an organic-polymer compound baked product, carbon fiber, activated carbon, or carbon blacks. Here, the organic-polymer compound baked product refers to a carbonized product obtained by baking a polymer material such as phenols and furans at a suitable temperature.

Specific examples of the element capable of forming an alloy with lithium include Na, K, Rb, Cs, Fr, Be, Mg, Ca, Sr, Ba, Ra, Ti, Ag, Zn, Cd, Al, Ga, In, Si, Ge, Sn, Pb, Sb, and Bi, and Si or Sn is particularly preferable.

Specific examples of the compound including an element capable of forming an alloy with lithium include ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0 < v \le 2$), $SnO_w$ ($0 < w \le 2$), $SnSiO_3$, LiSiO, or LiSnO. $SiO_c$ ($0.3 \le x \le 1.6$) is particularly preferable. In addition, examples of the compound including an element capable of reacting to form an alloy with lithium include tin compounds such as tin alloys (Cu—Sn alloy, Co—Sn alloy, etc.).

Specific examples of the polymer material include polyacetylene and polypyrrole.

The separator allows lithium ions to pas therethrough while separating the positive electrode and the negative electrode to prevent short circuiting caused due to contact between both electrodes. Examples of the separator include a porous film in which one or more types of synthetic resins such as polytetrafluoroethylene, polypropylene, and polyethylene are used, or a porous film made of ceramics.

The electrolytic solution contains a nonaqueous solvent and an electrolyte dissolved in the nonaqueous solvent.

As the nonaqueous solvent, cyclic esters, linear esters, ethers, and the like may be used. Examples of the cyclic esters include ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. Examples of the linear esters include dimethyl carbonate, diethyl carbonate, dibutyl carbonate, dipropyl carbonate, methylethyl carbonate, propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. In the electrolytic solution, these nonaqueous solvents may be used singly, or multiple types of these nonaqueous solvents may be used in combination.

Examples of the electrolyte include lithium salts such as $LiClO_4$, $LiAsF_6$, $LiPF_6$, $LiBF_4$, $LiCF_3SO_3$ and $LiN(CF_3SO_2)_2$.

Examples of the electrolytic solution include a solution obtained by dissolving a lithium salt such as $LiClO_4$, $LiPF_6$, $LiBF_4$, or $LiCF_3SO_3$ at a concentration of about 0.5 mol/l to 1.7 mol/l in a nonaqueous solvent such as ethylene carbonate, dimethyl carbonate, propylene carbonate, or dimethyl carbonate.

A method for producing the lithium ion secondary battery only needs to include a step of placing the positive electrode of the present invention. Hereinafter, a specific method for producing the lithium ion secondary battery is exemplified. The separator is interposed between the positive electrode and the negative electrode to form an electrode assembly. The electrode assembly may be a laminated type obtained by stacking the positive electrode, the separator, and the negative electrode, or a wound type obtained by winding the positive electrode, the separator, and the negative electrode. The secondary battery is preferably formed as a lithium ion secondary battery by respectively connecting the current collector of the positive electrode to a positive electrode external terminal and the current collector of the negative electrode to a negative electrode external terminal using current collecting leads or the like, and then adding the electrolytic solution to the electrode assembly.

The lithium ion secondary battery may be mounted on a vehicle. The lithium ion secondary battery maintains a high charge/discharge capacity and has excellent cyclic performance. Thus, a vehicle equipped with this lithium ion secondary battery is a high-performance vehicle.

The vehicle may be a vehicle that uses, as all or a part of the source of power therefor, electrical energy obtained from a battery, and examples of the vehicle include electric vehicles, hybrid vehicles, plug-in hybrid vehicles, hybrid railway vehicles, electric forklift trucks, electric wheelchairs, electric assist bicycles, and electric two-wheeled vehicles.

Although the embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described more specifically by presenting Examples and Comparative Examples. The present invention is not limited to the Examples. Hereinafter, unless mentioned otherwise in particular, "part (s)" refers to part (s) by mass, and "%" refers to mass %.

Example 1

Step a)

66.7 parts of $LiNi_{5/10}CO_{2/10}Mn_{3/10}O_2$ having a mean particle diameter of 5 μm as a first positive electrode active material, 27.3 parts of $LiFePO_4$ of which the surface is coated with carbon and which has a mean particle diameter of 1 μm, as a second positive electrode active material, 3 parts of acetylene black having a mean particle diameter of 0.05 to 0.1 μm as a conductive additive, 3 parts of polyvinylidene fluoride as a binding agent, and about 54 parts in total amount of NMP as a solvent were mixed with a defoaming planetary mixer, to obtain a dispersion liquid.

Here, the true density of $LiNi_{5/10}CO_{2/10}Mn_{3/10}O_2$ was 4.8 g/cm$^3$, the true density of $LiFePO_4$ was 3.6 g/cm$^3$, the true density of the acetylene black was 2 g/cm$^3$, the true density of polyvinylidene fluoride was 1.78 g/cm$^3$, the tap density of $LiNi_{5/10}CO_{2/10}Mn_{3/10}O_2$ was 2.2 g/cm$^3$, and the tap density of $LiFePO_4$ was 0.8 g/cm$^3$.

Step b)

An aluminum foil having a thickness of 20 μm was prepared as a current collector. The dispersion liquid produced in the step a) was put on the surface of the aluminum foil and applied in a film form by using a doctor blade. The aluminum foil on which the dispersion liquid had been applied was dried at 80° C. for 20 minutes to remove NMP through volatilization, to form a positive electrode active material layer on the aluminum foil surface.

Step c)

A roll press machine (Oono-roll Corporation) was used as a compression device. The aluminum foil on which the positive electrode active material layer in the step b) had been formed was placed on the compression device. As a roll gap value, 80 μm was inputted into the compression device such that the porosity p of the positive electrode active material layer after compression was 0.277.

Here, occupancy ratio: $(1-p)\times(Wt_1/dt_1)/((Wt_1/dt_1)+(Wt_2/dt_2)+(Wt_{3-1}/d_{3-1})+(Wt_{3-2}/d_{3-2}))=0.32$.

Step d)

The compression device was activated to compress the positive electrode active material layer. The obtained positive electrode was heated at 120° C. for 6 hours by a vacuum dryer, and was cut out into a predetermined shape (a rectangular shape of 40 mm×80 mm) to obtain a positive electrode of Example 1.

Here, the mass of the positive electrode of Example 1 was 1098.7 mg, the mass of the positive electrode active material layer was 900.3 mg, the coating film thickness of the positive electrode was 0.096 mm, and the volume of the positive electrode active material layer was calculated as 0.3072 cm$^3$ from these results. Then, the porosity p calculated by: subtracting, from 0.3072 cm$^3$, the sums of theoretical volumes of the respective components included in the positive electrode active material layer, the theoretical volumes being calculated from the blending amounts (parts by mass) and the true densities of the respective components; and dividing the resultant value by 0.3072 cm$^3$, was 0.2772. Furthermore, the occupancy ratio was confirmed as $(1-p)\times(Wt_1/dt_1)/((Wt_1/dt_1)+(Wt_2/dt_2)+(Wt_{3-1}/d_{3-1})+(Wt_{3-2}/d_{3-2}))=0.324$.

Example 2

Step a)

68.6 parts of $LiNi_{5/10}CO_{2/10}Mn_{3/10}O_2$ having a mean particle diameter of 5 μm as a first positive electrode active material, 25.4 parts of $LiFePO_4$ of which the surface is coated with carbon and which has a mean particle diameter of 1 μm, as a second positive electrode active material, 3 parts of acetylene black having a mean particle diameter of 0.05 to 0.1 μm as a conductive additive, 3 parts of polyvinylidene fluoride as a binding agent, and about 54 parts in total amount of NMP as a solvent were mixed with a defoaming planetary mixer, to obtain a dispersion liquid.

The step b) was performed in the same manner as in Example 1.

The step c) was performed in the same manner as in Example 1 except for inputting 80 μm as a roll gap value into the compression device such that the porosity p of the positive electrode active material layer after compression was 0.279. Here, occupancy ratio: $(1-p)\times(Wt_1/dt_1)/((Wt_1/dt_1)+(Wt_2/dt_2)+(Wt_{3-1}/d_{3-1})+(Wt_{3-2}/d_{3-2}))=0.34$.

The step d) was performed in the same manner as in Example 1 to obtain a positive electrode of Example 2.

Here, the mass of the positive electrode of Example 2 was 1101.2 mg, the mass of the positive electrode active material layer was 902.8 mg, the coating film thickness of the positive electrode was 0.096 mm, and the volume of the positive electrode active material layer was calculated as 0.3072 cm$^3$ from these results. Then, the porosity p was calculated as 0.2790. Furthermore, the occupancy ratio was confirmed as $(1-p)\times(Wt_1/dt_1)/((Wt_1/dt_1)+(Wt_2/dt_2)+(Wt_{3-1}/d_{3-1})+(Wt_{3-2}/d_{3-2}))=0.340$.

Example 3

Step a)

71.4 parts of $LiNi_{5/10}CO_{2/10}Mn_{3/10}O_2$ having a mean particle diameter of 5 μm as a first positive electrode active material, 22.6 parts of $LiFePO_4$ of which the surface is coated with carbon and which has a mean particle diameter of 1 μm, as a second positive electrode active material, 3 parts of acetylene black having a mean particle diameter of 0.05 to 0.1 μm as a conductive additive, 3 parts of polyvinylidene fluoride as a binding agent, and about 54 parts in total amount of NMP as a solvent were mixed with a defoaming planetary mixer, to obtain a dispersion liquid.

The step b) was performed in the same manner as in Example 1.

The step c) was performed in the same manner as in Example 1 except for inputting 90 μm as a roll gap value into the compression device such that the porosity p of the positive electrode active material layer after compression was 0.287. Here, occupancy ratio: $(1-p) \times (Wt_1/dt_1)/((Wt_1/dt_1)+(Wt_2/dt_2)+(Wt_{3-1}/d_{3-1})+(Wt_{3-2}/d_{3-2}))=0.36$.

The step d) was performed in the same manner as in Example 1 to obtain a positive electrode of Example 3.

Here, the mass of the positive electrode of Example 3 was 1107.6 mg, the mass of the positive electrode active material layer was 909.2 mg, the coating film thickness of the positive electrode was 0.097 mm, and the volume of the positive electrode active material layer was calculated as 0.3104 cm$^3$ from these results. Then, the porosity p was calculated as 0.2871. Furthermore, the occupancy ratio was confirmed as $(1-p) \times (Wt_1/dt_1)/((Wt_1/dt_1)+(Wt_2/dt_2)+(Wt_{3-1}/d_{3-1})+(Wt_{3-2}/d_{3-2}))=0.362$.

Example 4

Step a)

66.7 parts of LiNi$_{5/10}$Co$_{2/10}$Mn$_{3/10}$O$_2$ having a mean particle diameter of 5 μm as a first positive electrode active material, 27.3 parts of LiFePO$_4$ of which the surface is coated with carbon and which has a mean particle diameter of 1 μm, as a second positive electrode active material, 3 parts of acetylene black having a mean particle diameter of 0.05 to 0.1 μm as a conductive additive, 3 parts of polyvinylidene fluoride as a binding agent, and about 54 parts in total amount of NMP as a solvent were mixed with a defoaming planetary mixer, to obtain a dispersion liquid.

The step b) was performed in the same manner as in Example 1.

The step c) was performed in the same manner as in Example 1 except for inputting 90 μm as a roll gap value into the compression device such that the porosity p of the positive electrode active material layer after compression was 0.3142.

Here, occupancy ratio: $(1-p) \times (Wt_1/dt_1)/((Wt_1/dt_1)+(Wt_2/dt_2)+(Wt_{3-1}/d_{3-1})+(Wt_{3-2}/d_{3-2}))=0.32$.

Step d)

The compression device was activated to compress the positive electrode active material layer. The obtained positive electrode was heated at 120° C. for 6 hours by a vacuum dryer, and was cut out into a predetermined shape (a rectangular shape of 40 mm×80 mm) to obtain a positive electrode of Example 4.

Here, the mass of the positive electrode of Example 4 was 1100.8 mg, the mass of the positive electrode active material layer was 902.4 mg, the coating film thickness of the positive electrode was 0.099 mm, and the volume of the positive electrode active material layer was calculated as 0.3168 cm$^3$ from these results. Then, the porosity p calculated by: subtracting, from 0.3168 cm$^3$, the sums of theoretical volumes of the respective components included in the positive electrode active material layer, the theoretical volumes being calculated from the blending amounts (parts by mass) and the true densities of the respective components; and dividing the resultant value by 0.3168 cm$^3$ was 0.3142. Furthermore, the occupancy ratio was confirmed as $(1-p) \times (Wt_1/dt_1)/((Wt_1/dt_1)+(Wt_2/dt_2)+(Wt_{3-1}/d_{3-1})+(Wt_{3-2}/d_{3-2}))=0.307$.

Comparative Example 1

Step a)

73.3 parts of LiNi$_{5/10}$Co$_{2/10}$Mn$_{3/10}$O$_2$ having a mean particle diameter of 5 μm as a first positive electrode active material, 20.7 parts of LiFePO$_4$ of which the surface is coated with carbon and which has a mean particle diameter of 1 μm, as a second positive electrode active material, 3 parts of acetylene black having a mean particle diameter of 0.05 to 0.1 μm as a conductive additive, 3 parts of polyvinylidene fluoride as a binding agent, and about 54 parts in total amount of NMP as a solvent were mixed with a defoaming planetary mixer, to obtain a dispersion liquid.

The step b) was performed in the same manner as in Example 1.

The step c) was performed in the same manner as in Example 1 except for inputting 90 μm as a roll gap value into the compression device such that the porosity p of the positive electrode active material layer after compression was 0.285. Here, occupancy ratio: $(1-p) \times (Wt_1/dt_1)/((Wt_1/dt_1)+(Wt_2/dt_2)+(Wt_{3-1}/d_{3-1})+(Wt_{3-2}/d_{3-2}))=0.38$.

The step d) was performed in the same manner as in Example 1 to obtain a positive electrode of Comparative Example 1.

Here, the mass of the positive electrode of Comparative Example 1 was 1115.3 mg, the mass of the positive electrode active material layer was 916.9 mg, the coating film thickness of the positive electrode was 0.097 mm, and the volume of the positive electrode active material layer was calculated as 0.3104 cm$^3$ from these results. Then, the porosity p was calculated as 0.2850. Furthermore, the occupancy ratio was confirmed as $(1-p) \times (Wt_1/dt_1)/((Wt_1/dt_1)+(Wt_2/dt_2)+(Wt_{3-1}/d_{3-1})+(Wt_{3-2}/d_{3-2}))=0.382$.

Comparative Example 2

Step a)

75.2 parts of LiNi$_{5/10}$CO$_{2/10}$Mn$_{3/10}$O$_2$ having a mean particle diameter of 5 μm as a first positive electrode active material, 18.8 parts of LiFePO$_4$ of which the surface is coated with carbon and which has a mean particle diameter of 1 μm, as a second positive electrode active material, 3 parts of acetylene black having a mean particle diameter of 0.05 to 0.1 μm as a conductive additive, 3 parts of polyvinylidene fluoride as a binding agent, and about 54 parts in total amount of NMP as a solvent were mixed with a defoaming planetary mixer, to obtain a dispersion liquid.

The step b) was performed in the same manner as in Example 1.

The step c) was performed in the same manner as in Example 1 except for inputting 90 μm as a roll gap value into the compression device such that the porosity p of the positive electrode active material layer after compression was 0.283. Here, occupancy ratio: $(1-p) \times (Wt_1/dt_1)/((Wt_1/dt_1)+(Wt_2/dt_2)+(Wt_{3-1}/d_{3-1})+(Wt_{3-2}/d_{3-2}))=0.38$.

The step d) was performed in the same manner as in Example 1 to obtain a positive electrode of Comparative Example 2.

Here, the mass of the positive electrode of Comparative Example 2 was 1122.6 mg, the mass of the positive electrode active material layer was 924.2 mg, the coating film thickness of the positive electrode was 0.097 mm, and the volume of the positive electrode active material layer was calculated as 0.3104 cm$^3$ from these results. Then, the porosity p was calculated as 0.2832. Furthermore, the occupancy ratio was confirmed as $(1-p) \times (Wt_1/dt_1)/((Wt_1/dt_1)+(Wt_2/dt_2)+(Wt_{3-1}/d_{3-1})+(Wt_{3-2}/d_{3-2}))=0.403$.

The respective components used in Examples 2 to 4 and Comparative Examples 1 and 2 are the same as those used in Example 1.

Example 5

A lithium ion secondary battery of Example 5 was produced as follows by using the positive electrode of Example 1.

A negative electrode was produced as follows.

As a negative electrode active material, $SiO_x$ ($0.3 \le x \le 1.6$) and natural graphite were used. As a binding agent, polyimide and polyamide-imide were used. As a conductive additive, acetylene black was used. These materials were mixed such that $SiO_x(0.3 \le x \le 1.6)$:natural graphite:polyimide:polyamide-imide:acetylene black was 32:50:5:5:8 in mass ratio, and NMP was added to the mixture, to obtain a negative electrode mixture material preparation liquid in a slurry form. The negative electrode mixture material preparation liquid was applied to the surface of an aluminum foil having a thickness of 20 μm as a negative electrode current collector. Next, a drying step and a compressing step were performed in the same manner as for the positive electrode of Example 1 described above, to obtain a negative electrode. The weight of the negative electrode mixture material per unit area of the applied surface of the negative electrode current collector was 7.7 mg/cm$^2$, and the applied area of the negative electrode current collector was 42 mm×82 mm.

A laminated type lithium ion secondary battery was produced as follows by using the positive electrode of Example 1 and the above negative electrode.

A rectangular sheet (50×90 mm, a thickness of 25 μm) composed of a resin film having a three-layer structure with polypropylene/polyethylene/polypropylene was interposed as a separator between the positive electrode and the negative electrode, to form an electrode assembly. The electrode assembly was covered with a set of two sheets of a laminate film. The laminate film was formed into a bag-like shape by sealing three sides thereof, and then an electrolytic solution was poured thereinto. As the electrolytic solution, a solution obtained by dissolving $LiPF_6$ in a solvent, obtained by mixing ethylene carbonate, methylethyl carbonate, and diethyl carbonate at a volume ratio of 3:3:4, to be 1 mol/L was used. Then, the remaining one side was sealed to seal the four sides airtight, to obtain a laminated type lithium ion secondary battery of Example 5 in which the electrode assembly and the electrolytic solution were sealed. Each of the positive electrode and the negative electrode includes a tab connectable electrically with the outside, and one part of the tab extends outside the laminated type lithium ion secondary battery.

Example 6

A lithium ion secondary battery of Example 6 was produced by the same method as in Example 5 except for using the positive electrode of Example 2.

Example 7

A lithium ion secondary battery of Example 7 was produced by the same method as in Example 5 except for using the positive electrode of Example 3.

Example 8

A lithium ion secondary battery of Example 8 was produced by the same method as in Example 5 except for using the positive electrode of Example 4.

Comparative Example 3

A lithium ion secondary battery of Comparative Example 3 was produced by the same method as in Example 5 except for using the positive electrode of Comparative Example 1.

Comparative Example 4

A lithium ion secondary battery of Comparative Example 4 was produced by the same method as in Example 5 except for using the positive electrode of Comparative Example 2.

Evaluation Example 1

With respect to each of the lithium ion secondary batteries of Examples 5 to 8 and Comparative Examples 3 and 4, a nail penetration test was performed by the following method, and the surface temperature of the lithium ion secondary battery when internal short circuiting occurred was measured. The results are shown in Table 1.

With respect to the lithium ion secondary battery, constant-potential charging was performed until the potential stabilized at 4.5 V. The lithium ion secondary battery that had been charged (the discharge capacity thereof was estimated as approximately 4 Ah) was placed on a constraining plate having a hole with a diameter of 20 mm. The constraining plate was placed on a pressing machine having a nail attached to an upper portion thereof. The nail was moved at a rate of 20 mm/sec from up to down until the nail penetrated the lithium ion secondary battery on the constraining plate and the tip portion of the nail reached the interior of the hole of the constraining plate. The surface temperature of the battery after the penetration of the nail was measured. Table 1 shows the maximum temperature among the observed surface temperatures. The used nail was shaped to have a diameter of 8 mm and a tip angle of 60°, and the material of the nail was S45C specified by JIS G 4051.

TABLE 1

| Secondary battery | Positive electrode | Occupancy ratio | Maximum surface temperature |
|---|---|---|---|
| Example 5 | Example 1 | 0.324 | 58.4° C. |
| Example 6 | Example 2 | 0.340 | 47.1° C. |
| Example 7 | Example 3 | 0.362 | 53.5° C. |
| Example 8 | Example 4 | 0.307 | 39.4° C. |
| Comparative Example 3 | Comparative Example 1 | 0.382 | 482.8° C. |
| Comparative Example 4 | Comparative Example 2 | 0.403 | 573.0° C. |

From the results in Table 1, when the relationship between the occupancy ratio and the maximum surface temperature is taken into consideration, a point at which the maximum surface temperature significantly increases is found to be present between occupancy ratios of 0.362 and 0.382.

The positive electrode active material layer that satisfies the occupancy ratio: $(1-p) \times (Wt_1/dt_1)/((Wt_1/dt_1)+(Wt_2/dt_2)+(Wt_3/d_3)) < 0.38$ was confirmed to be able to suppress heat generation of the lithium ion secondary battery in which internal short circuiting occurs, to a certain degree.

The invention claimed is:

1. A positive electrode active material layer comprising a first positive electrode active material, a second positive electrode active material having a lower charge/discharge potential than the first positive electrode active material, and an additive, wherein the first positive electrode active material is a compound having a layered rock salt structure and represented by a general formula: $Li_aNi_bCo_cMn_dD_eO_f$ ($0.2 \le a \le 1.7$, $b+c+d+e=1$, $25/100<b<60/100$, $0 \le e<1$, D is at least one element selected from Li, Fe, Cr, Cu, Zn, Ca, Mg, Zr, S, Si, Na, K, and Al, $1.7 \le f \le 2.1$), the second positive electrode active material is a material represented by a general formula: $LiM_hPO_4$ (M is at least one element selected from Fe, Ni, Cu, Mg, Zn, V, Ca, Sr, Ba, Ti, Al, Si, B, Te, and Mo, $0<h<2$), a blending mass ratio of the first positive electrode active material and the second positive electrode active material in the positive electrode active material layer is in a range of 72:28 to 65:35, and when a tap density of the first positive electrode active material is defined as $dt_1$, a tap density of the second positive electrode active material is defined as $dt_2$, a true density of the additive is defined as $d_3$, a mass percentage of the first positive electrode active material in the positive electrode active material layer is defined as $Wt_1$, a mass percentage of the second positive electrode active material in the positive electrode active material layer is defined as $Wt_2$, a mass percentage of the additive in the positive electrode active material layer is defined as $Wt_3$, and a porosity of the positive electrode active material layer is defined as p, the positive electrode active material layer satisfies $(1-p) \times (Wt_1/dt_1)/((Wt_1/dt_1)+(Wt_2/dt_2)+(Wt_3/d_3))<0.38$.

2. A lithium ion secondary battery comprising the positive electrode active material layer according to claim 1.

3. The positive electrode active material layer according to claim 1, wherein the second positive electrode active material is coated with carbon.

* * * * *